US008351534B2

(12) United States Patent
Mussmann et al.

(10) Patent No.: US 8,351,534 B2
(45) Date of Patent: Jan. 8, 2013

(54) DISTRIBUTED MAXIMAL RATIO COMBINING RECEIVER ARCHITECTURE

(75) Inventors: David E. Mussmann, Spencerville, IN (US); Thomas E. Young, Fort Wayne, IN (US); Mark A. Gloudemans, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 456 days.

(21) Appl. No.: 12/762,720

(22) Filed: Apr. 19, 2010

(65) Prior Publication Data

US 2010/0266062 A1  Oct. 21, 2010

Related U.S. Application Data

(60) Provisional application No. 61/170,427, filed on Apr. 17, 2009, provisional application No. 61/172,416, filed on Apr. 24, 2009.

(51) Int. Cl.
*H04B 7/02* (2006.01)
*H04L 1/02* (2006.01)

(52) U.S. Cl. ........ 375/267; 375/260; 375/299; 370/203; 370/208

(58) Field of Classification Search .................. 375/260, 375/267, 299; 370/203–211
See application file for complete search history.

(56) References Cited

U.S. PATENT DOCUMENTS

| | | | |
|---|---|---|---|
| 6,512,738 B1 | 1/2003 | Namekata et al. | |
| 6,700,919 B1 | 3/2004 | Papasakellariou | |
| 6,711,123 B1 | 3/2004 | Taira | |
| 2003/0053493 A1 | 3/2003 | Graham Mobley et al. | |
| 2003/0053522 A1 | 3/2003 | Hayoun et al. | |
| 2003/0162518 A1 | 8/2003 | Baldwin et al. | |
| 2005/0208897 A1* | 9/2005 | Lyons et al. | 455/67.11 |
| 2005/0249319 A1 | 11/2005 | Suh et al. | |
| 2005/0254596 A1 | 11/2005 | Naguib | |
| 2005/0265473 A1 | 12/2005 | Keller | |
| 2006/0121862 A1 | 6/2006 | Cornwall et al. | |
| 2006/0210070 A1 | 9/2006 | Reznik et al. | |
| 2008/0031375 A1* | 2/2008 | Zhou et al. | 375/267 |
| 2008/0291821 A1 | 11/2008 | Dent | |
| 2009/0086752 A1 | 4/2009 | Anderson et al. | |
| 2010/0265999 A1 | 10/2010 | Stern et al. | |

FOREIGN PATENT DOCUMENTS

| | | |
|---|---|---|
| EP | 2001151 A2 | 4/2009 |
| WO | 9314587 A1 | 7/1993 |
| WO | 2007038694 A1 | 4/2007 |
| WO | 2009018655 A1 | 2/2009 |

OTHER PUBLICATIONS

Alemar, V. et al., "Synchronization Techniques for Hoperlan/2", IEEE 54th Vehicular Technology Conference, vol. 2, Oct. 7, 2001-Oct. 11, 2001, pp. 762-766.

* cited by examiner

*Primary Examiner* — Curtis Odom
(74) *Attorney, Agent, or Firm* — Lando & Anastasi, LLP

(57) ABSTRACT

A wireless communication system in which each receiver is configured synchronize to a received waveform using only its local received signal without requiring any information about other receivers in the system. The local receiver is configured to remove frequency and/or phase error based on information encoded in the received waveform. In some examples, the local receiver uses channel probe information embedded in the received waveform to provide channel estimates for each communication channel over which the signals are received and, based on the estimates, adjusts the received signals for phase shift and amplitude scaling caused by the channel. Signal acquisition (in time and frequency), as well as partial demodulation (for channel estimation), is done independently for each channel. Signals from each channel are combined using a maximal ratio combiner.

16 Claims, 15 Drawing Sheets

DISTRIBUTED MAXIMAL RATIO COMBINING RECEIVER ARCHITECTURE

CROSS REFERENCE TO RELATED APPLICATIONS

This application claims priority under 35 U.S.C. §119(e) to U.S. Provisional Application No. 61/170,427 entitled DISTRIBUTED MAXIMAL RATIO COMBINING RECEIVER ARCHITECTURE filed on Apr. 17, 2009 and to U.S. Provisional Application No. 61/172,416 entitled DISTRIBUTED MAXIMAL RATIO COMBINING RECEIVER ARCHITECTURE filed on Apr. 24, 2009, both of which are herein incorporated by reference in their entireties.

BACKGROUND

1. Field of Invention

The present invention relates to communications systems and, more particularly, to digital receivers used in digital communication systems.

2. Background

Communication systems use diversity transmission/combining techniques, i.e., transmitting and/or receiving the same signal over multiple propagation channels, to combat environmental effects such as multipath, fading, etc. If the same signal is transmitted by two transmitters or received by two receivers, it can be assumed that the noise in each channel is independent (i.e., there is no correlation between the noise in one channel and the noise in the other channel), whereas there is correlation between the two signals. This information can be used to combine the signals from each channel to achieve an improved overall signal-to-noise ratio.

Maximal ratio combining is a diversity combining technique used in receivers to provide improved sensitivity and diversity gain. Signals from each channel are weighted according to their signal-to-noise ratios, using their RMS (root mean squared) signal levels and noise variances, and added together. More specifically, the gain of each channel is made proportional to the RMS signal level and inversely proportional to the mean square noise level in that channel. Existing implementations that employ maximal ratio combining require either that the receiver(s) be in a single physical location or that the receiver(s) be in a known physical location(s) in order to support the signal processing to combine the signals. The known location information is used to synchronize and combine the incoming signals in order to get maximum diversity gain.

SUMMARY OF THE INVENTION

Aspects and embodiments are directed to systems and methods of improving the performance of a digital radio receiving system. In particular, transceivers may be configured to use a waveform having embedded features to implement local, independent signal acquisition and demodulation at each receiver, obviating the need for coherent processing between the receivers. Furthermore, the local receiver also uses channel probe information embedded in the waveform to provide channel estimates for each channel and thereby adjust the received signals for phase shift and amplitude scaling, as discussed further below. Signal acquisition (in time and frequency), as well as partial demodulation (for channel estimation) may be done independently for each channel, obviating the need for synchronization across multiple channels. As a result, the receivers to be located in remote and/or arbitrary physical locations and therefore maximal ratio combining can be implemented, providing the maximum diversity benefit, without the constraints imposed by existing and conventional implementations.

According to one embodiment, a method of maximal ratio combining in a wireless radio network comprises receiving a first signal comprising a packet-based waveform structure at a first receiver, each packet of the waveform comprising a preamble segment, a payload segment, and a packet self discovery segment, the preamble segment comprising a plurality of orthogonal frequency division multiplexed (OFDM) symbols, receiving a second signal comprising the waveform structure at a second receiver, acquiring a time of arrival of the first signal at the first receiver based on individually correlating each OFDM symbol of the preamble segment to provide a first series of correlations and summing the first series of correlations, and acquiring a time of arrival of the second signal at the second receiver based on individually correlating each OFDM symbol of the preamble segment to provide a second series of correlations and summing the second series of correlations. The method further comprises normalizing the first signal based on pilot symbols encoded within the payload segment of the waveform structure to provide a first normalized signal, normalizing the second signal based on the pilot symbols encoded within the payload segment of the waveform structure to provide a second normalized signal, and combining the first and second normalized signals using a maximal ratio combiner coupled to each of the first and second receivers to provide a received signal.

The method may further comprise demodulating the received signal based on information contained in the packet self discovery segment. In one example, the method further comprises determining a first frequency error in first signal by computing a first frequency error for each symbol in the preamble segment based on average rotation vectors from symbol to adjacent symbol, and determining a second frequency error in second signal by computing a second frequency error for each symbol in the preamble segment based on average rotation vectors from symbol to adjacent symbol. In another example, the method further comprises at the first receiver, estimating channel conditions of a first communication channel over which the first signal is received, and at the second receiver, estimating channel conditions of a second communication channel over which the second signal is received. In one example, wherein the first and second signals each comprises a sequence of OFDM symbols, estimating the channel conditions for each channel includes demodulating the pilot symbols embedded within the payload segment to determine a phase shift and amplitude scaling applied to the first and second signals by conditions of the first and second channels, respectively. In another example, wherein each pilot symbol comprises a plurality of tones of different frequencies, the plurality of tones including a plurality of pilot tones, determining the phase shift and amplitude scaling includes measuring a complex scaling of each pilot tone to provide a pilot tone channel estimate for each pilot tone. The method may further comprise, for each of the first and second signals, applying linear filtering to smooth the pilot tone channel estimates to provide channel estimates for each tone of the plurality of tones, and linearly interpolating the channel estimates to provide a symbol estimate for each OFDM symbol of the sequence of OFDM symbols. Combining the first and second normalized signals may include, for example, determining a first signal to noise ratio for the first signal, determining a second signal to noise ratio for the second signal, and weighting the first and second signals based on the first and second signal to noise ratios, respectively.

According to another embodiment, a method of maximal ratio combining in a wireless radio network comprises receiving a signal at each of a plurality of receivers to provide a locally received signal at each receiver, the signal comprising a packet-based waveform in which each packet comprises a sequence of orthogonal frequency division multiplexed (OFDM) symbols arranged into a plurality of waveform segments including a preamble segment, a payload segment, and a packet self discovery segment, and at each receiver, synchronizing the receiver to the locally received signal in time based on characteristics of the locally received signal without synchronizing across the plurality of receivers, at each receiver, removing frequency error from the locally received signal based on the preamble segment. The method further comprises at each receiver, estimating channel conditions of a communications channel over which the locally received signal is received based on pilot symbols embedded in the payload segment, at each receiver, normalizing the locally received signal based on the estimated channel conditions to provide a plurality of normalized signals, and combining the plurality of normalized signals using a maximal ratio combiner coupled to each of the plurality of receivers to provide a received signal.

In one example, synchronizing the receiver to the locally received signal in time comprises individually correlating each OFDM symbol in the preamble segment to provide a series of correlations and summing the series of correlations. In another example, removing the frequency error from the locally received signal includes determining a symbol frequency error for each OFDM symbol in the preamble segment based on average rotation vectors from symbol to adjacent symbol, and compensating each symbol in the locally received signal for the symbol frequency error. In another example, estimating the channel conditions includes demodulating the pilot symbols to determine a phase shift and amplitude scaling applied to the locally received signal by the channel conditions of the communications channel over which the locally received signal is received. In one example, each pilot symbol comprises a plurality of tones of different frequencies, the plurality of tones including a plurality of pilot tones, and determining the phase shift and amplitude scaling includes measuring a complex scaling of each pilot tone to provide a pilot tone channel estimate for each pilot tone. The method may further comprise applying linear filtering to smooth the pilot tone channel estimates to provide channel estimates for each tone of the plurality of tones, and linearly interpolating the channel estimates to provide a symbol estimate for each OFDM symbol of the sequence of OFDM symbols. In one example, combining the plurality of normalized signals includes determining a signal to noise ratio for each normalized signal, and weighting each normalized signal based on the signal to noise ratio. The method may further comprise demodulating the received signal based on information contained in the packet self discovery segment.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
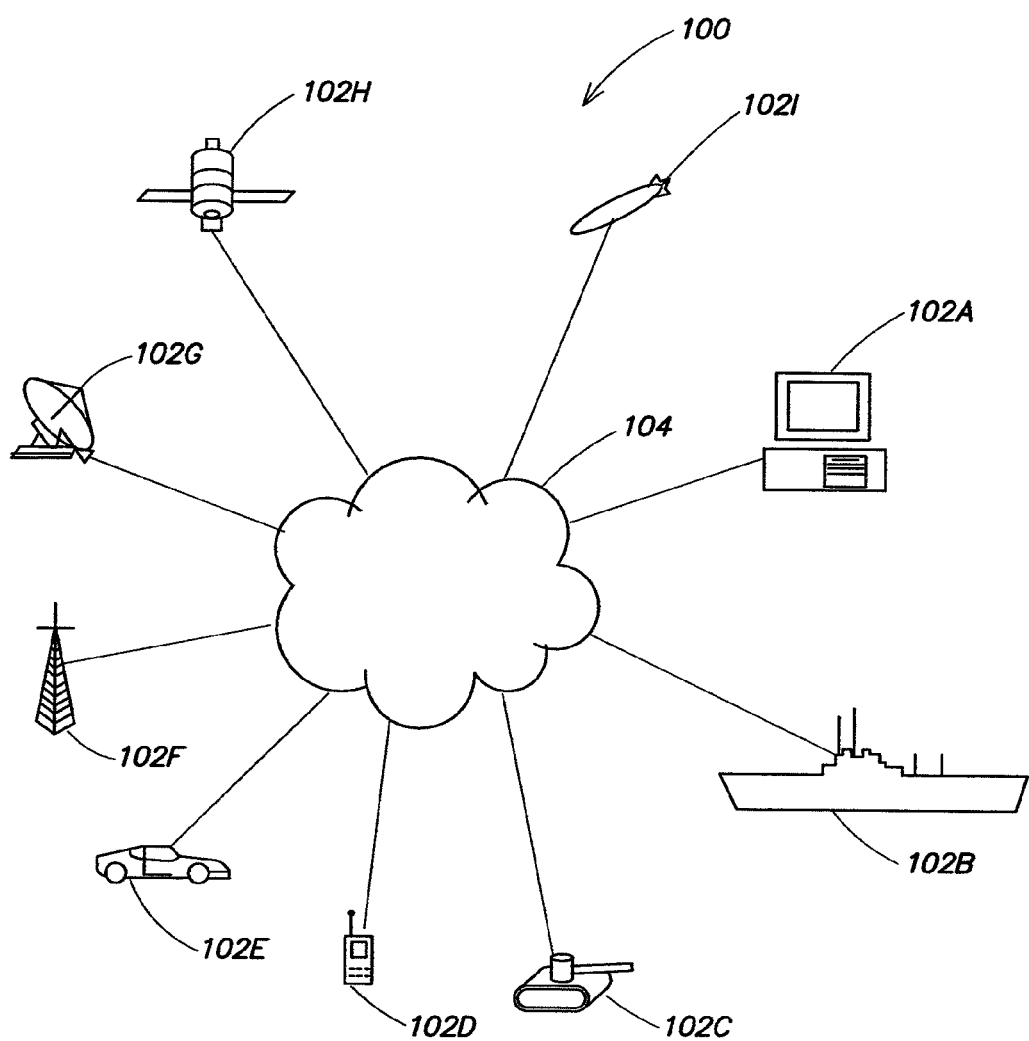
FIG. 1 is a diagram of one example of a system for communicating via Radio over Internet Protocol.

Radio and other communication networks are increasingly confronted with extremely difficult radio frequency (RF) environments, including urban areas with severe multipath propagation conditions. Accordingly, it may be desirable to implement techniques for improving signal quality and/or network performance and reliability in these environments. As discussed above, maximal ratio combining is one technique that can be used to improve receiver sensitivity and provide diversity gain. For example, maximal ratio combining may be used to automatically combine received signals when multiple receivers are present in a system. Received signals are weighted and coherently combined according to their root mean squared (RMS) signal levels and mean square noise levels (or noise variances). This technique results in a signal to noise ratio (SNR) gain because the weighting ensures that the output SNR is at least as good as the best input SNR.

Conventional implementations of maximal ratio combining struggle to maintain synchronization between multiple channels in light of transmitting analog baseband signal information over arbitrary distances. In particular, a principle difficulty encountered during the implementation of a maximal ratio combining receiver is the provision of time and phase coherency between multiple receiver channels. Conventional implementations of maximal ratio combining rely upon physical proximity and shared resources to maintain this coherency. For example, conventional receivers use matched analog processing hardware and shared timing oscillators or clocks, and often require careful calibration to support phase coherency and to avoid ambiguity in frequency or time among different channels. This tight coupling generally requires that the hardware implementing multiple receiver channels be confined to a single physical system. Furthermore, conventional systems that implement maximal ratio combining require the receivers to be in a single physical location or to be in known physical locations.

Aspects and embodiments of the present invention are directed to systems and methods for implementing maximal ratio combining in a radio transceiver that overcome these limitations of conventional systems by allowing each receiver channel to derive time coherence from the synchronization information in the received signal and phase coherence from the channel probes in the received signal. In particular, aspects and embodiments may absolve the need to have waveform processing occur at a single physical location and the need to have predetermined, fixed locations for the receivers. By eliminating the need for tight coupling between receiver channels, embodiments enable a new class of distributed maximal ratio combining receiver architectures. According to one embodiment, there is provided an efficient mechanism by which to synchronize receivers used in multiple input multiple output (MIMO) configurations, so as to enable construction of a maximal ratio combining receiver system from multiple, physically distributed receivers, as discussed further below.

According to one embodiment, the transmitter(s) inserts information into the transmitted waveform from which the receiver can derive time coherence and phase coherence, as discussed further below. Thus, each receiver may synchronize to the received waveform using only its local received signal. The local receiver may also remove frequency and/or phase error based on information encoded in the waveform, as discussed further below. For example, the local receiver may be configured to remove errors in frequency translation in the transmitter or receiver resulting from, for example, local oscillator frequency errors, and/or to compensate for changes in frequency caused by environmental effects and/or Doppler shift if the transmitter and/or receiver are moving. The local receiver also uses channel probe information embedded in the waveform to remove phase shift and amplitude scaling, as discussed further below. Thus, signal acquisition and partial demodulation may be performed independently for each channel, removing the need for synchronization across all receiver channels. The normalized signal from each receiver is the combined using a maximal ratio combining process to provide a composite signal having the maximal signal to noise ratio. Thus, embodiments use local receiver synchronization to an incident waveform to obviate the need to combine signals contemporaneously. This technique may obviate the need for coherent processing between the receivers, and optionally may permit the combining of the signals from the receivers to be delayed relative to the time of reception. Thus, embodiments may result in the maximum diversity benefit, but without the constraints imposed by existing and conventional implementations.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Embodiments of the transceiver architecture discussed herein may be used in a wide variety of digital radio networks or other communications networks, and may be particularly applicable to radio receivers that operate in fading environments or near sensitivity limits. Some example applications include, but are not limited to, mobile tactical communications receivers, wireless mobile ad-hoc networks (MANET), and networks implementing Radio over Internet Protocol (RoIP). Today, RoIP is widely employed to communicate information including voice, data and video across a network. FIG. 1 illustrates a high-level block diagram of an example of a system 100 for communicating via RoIP. The system 100 can include a plurality of nodes 102 connected via a network 104. The plurality of nodes can include any communication device accessible via Internet Protocol. These can include two-way radios, computers (laptops, desktops, etc.), software running on a computer (for example, a Skype phone) a personal digital assistant (PDA), smartphone, etc. According to one embodiment, each node includes a transmitter and/or a receiver for transmitting or receiving communications over the network, respectively. The transmitting or receiving node may be provided by a wide variety of properly equipped devices including mobile devices such as ships, land-based military vehicles (humvees, tanks, etc.), personal vehicles, missiles, helicopters and airplanes as some examples. Further, the network can communicate via radio towers (including cell towers) and satellite communications.

According to various embodiments, the network 104 includes wireless networks, hardwired networks, or a combination of wireless and hardwired networks. In addition, embodiments can communicate over wide area networks (WAN), local area networks (LAN) or a combination of WANs and LANs. Further, the network 104 can include a private network, a public network (for example the Internet), or a combination of private and public networks. In accordance with one embodiment, the network employs a Mobile WiMax communication standard, for example, IEEE 802.16e. According to other embodiments, the network 104 can employ other communications standards, including for example, any standards suitable for packet-based signal transmission.

Figure 2:
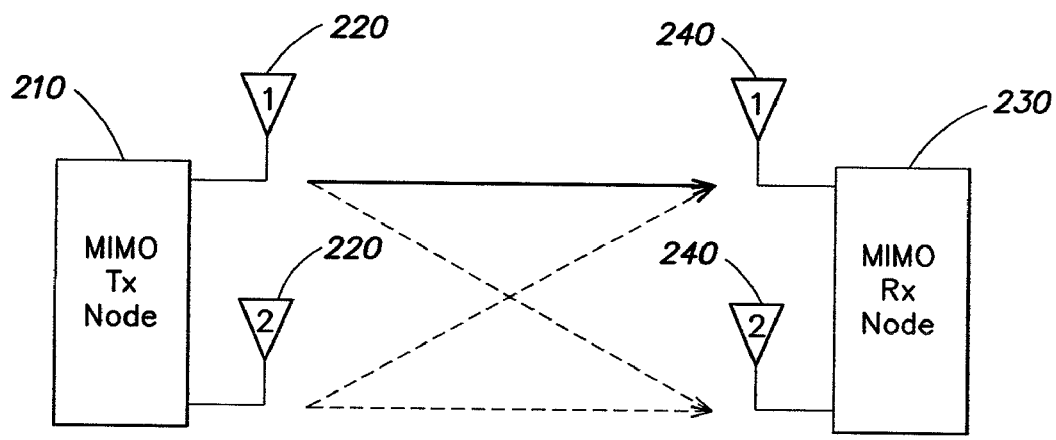
FIG. 2 is a block diagram of one example of a radio transceiver system configured for MIMO operation according to aspects of the invention.

Maximal ratio combining can be employed in a system where there are multiple receivers and/or transmitters present such that the receiver(s) receive multiple versions of the signal which can be combined to improve the signal to noise ratio, as discussed above. Referring to FIG. 2, there is illustrated a block diagram of an example of a 2T×2R (two transmitter by two receiver) MIMO (multiple input multiple output) configuration for a wireless radio system. MIMO operation provides time and space diversity through duplicative antennas and duplicative antenna paths which may result in greater communication link reliability and provide more robust connectivity in severe fading environments. Accordingly, the system includes a transmitter 210 that includes one or more transmit paths/antennas 220, and a receiver 230 which includes one or more receive paths/antennas 240. It is to be appreciated that although the following discussion may refer primarily to a 2T×2R MIMO configuration or 1T×2R configuration, the architectures, techniques and methods discussed herein are not limited to these configurations and may be applied in any nT×mR configuration, with at least one of n and m being greater than 1. In addition, the radio transceiver may be dynamically configurable between any of the above-mentioned configurations, for example, MIMO operation may be disabled (or enabled) via a user interface.

Figure 3:
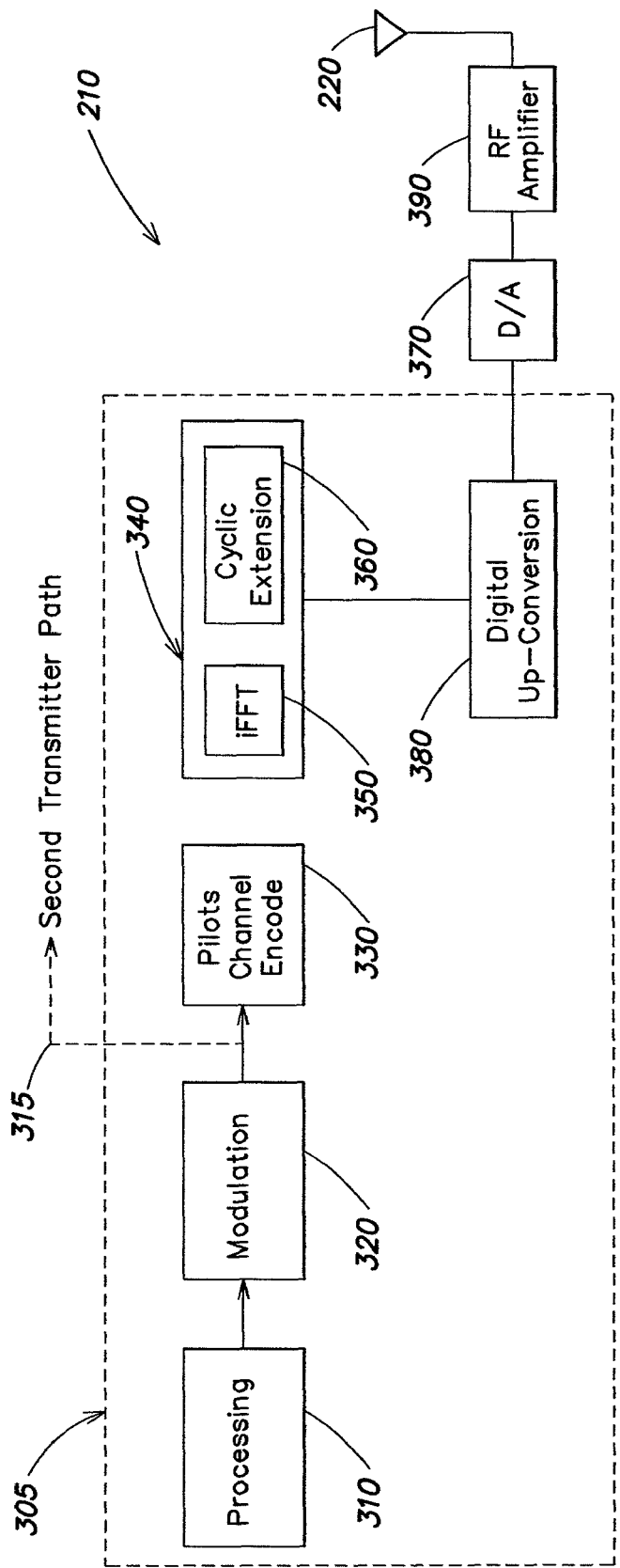
FIG. 3 is a block diagram of one example of a transmitter according to aspects of the invention.
Figure 4:
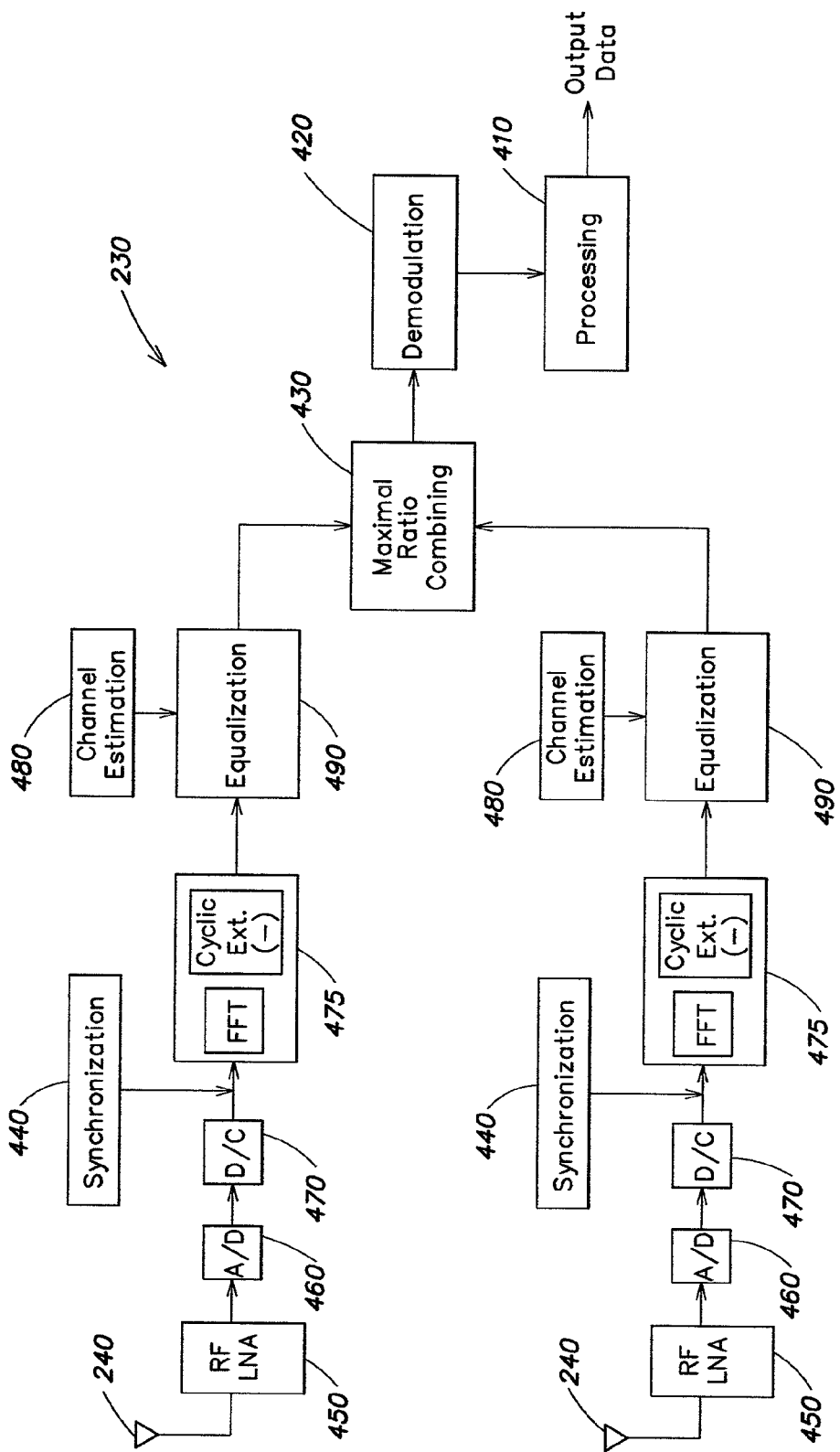
FIG. 4 is a block diagram of one example of a receiver configured to implement maximal ratio combining according to aspects of the invention.

Referring to FIGS. 3 and 4 there are illustrated block diagrams of an example of a transmitter 210 and a receiver 230, respectively, configured to implement maximal ratio combining according to one embodiment. In one example, at least portions of the receiver and transmitter systems are implemented as field programmable gate arrays (FPGAs) 305; however, it is to be appreciated that other implementations may be employed. Operation of the transmitter and receiver to implement maximal ratio combining according to certain embodiments is discussed below with continuing reference to FIGS. 3 and 4. In one example, the waveform used in the system is a packet based waveform that uses time division multiple access (TDMA) channel access, as discussed further below. Accordingly, the transmitter 210 includes a processing module 310 which constructs the waveform and may employ various transmit functions such as, for example, forward error correction (FEC) encoding, bit interleaving across the packet for improved transmission reliability, and/or transmission security features, such as encryption. The receiver 230 includes a corresponding processing module 410 that performs corresponding inverse functions, such as, for example, FEC decoding, de-interleaving and/or decryption. The transmitter also includes a modulator 320 that modulates the data according to a chosen modulation scheme such as, for example, Binary Phase Shift Keying (BPSK), Quadrature Phase Shift Keying (QPSK), or Quadrature Amplitude Modulation (QAM). The receiver 240 includes a corresponding demodulator 420.

As discussed above, one embodiment uses local receiver synchronization to the incident waveform to obviate the need to combine signals contemporaneously. Therefore, according to one embodiment, the transmitter(s) 210 inserts information into the transmitted waveform from which the receiver can derive time coherence and phase/frequency coherence, as discussed further below. Thus, each receiver 230 may synchronize to the received waveform using only its local received signal. Accordingly, the transmitted and received waveform includes features to facilitate implementing the time/frequency synchronization process. For example, the waveform may include a segment having very good autocorrelation properties to allow for time and frequency synchronization. A synchronization, or signal acquisition, module 440 in the receiver is used to resolve time and frequency offsets on each packet prior to demodulation. Frequency offsets between the receiver and the received waveform arise due to, for example, oscillator error and/or Doppler shift. In one example, the oscillator error is estimated to be about 0.1 ppm, corresponding to about ±500 Hz total offset at 2.5 GHz. In another example, the Doppler shift due a 700 meters/second relative velocity results in ±5.83 KHz total offset at 2.5 GHz. Thus, the total frequency offset may be about ±6.33 KHz. Time offsets between the receiver and the transmitter arise due to propagation time of the signal. For example, if the transmitter and receiver are about 100 Km apart, the time offset due to propagation delay may be about ±334 μs. In some embodiments the receiver may use a GPS (Global Positioning System) signal for coarse timing synchronization within the TDMA network. However, this GPS-based timing may be insufficient to accurately demodulate the signal, as demodulation may require very precise time resolution, for example, on the order of 100 ns RMS. Accordingly, as discussed above, the transmitter 210 inserts information into the waveform from which the receiver can accurately locate the signal in time and frequency.

Figure 5:
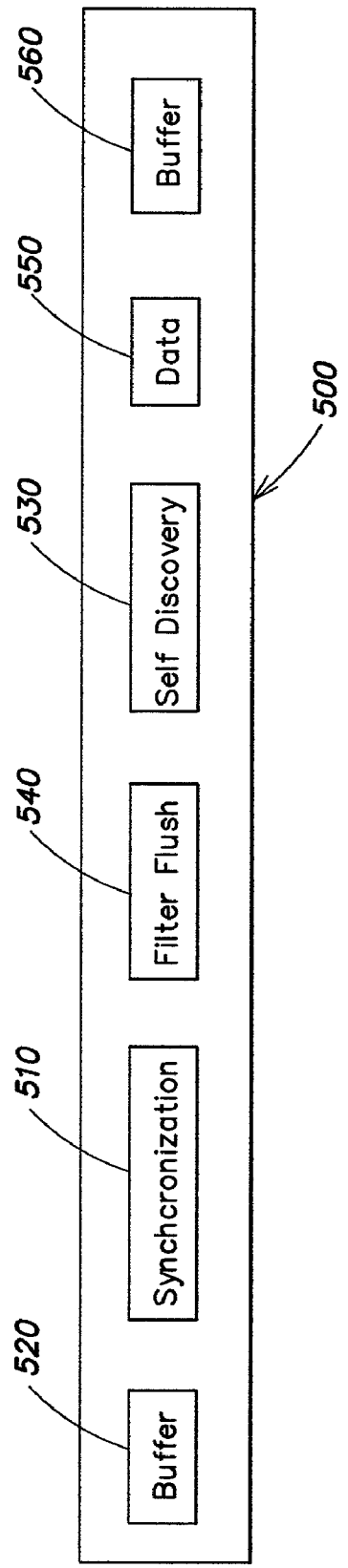
FIG. 5 is a block diagram of one example of a physical layer packet structure for a waveform according to aspects of the invention.

Referring to FIG. 5, there is illustrated one example of a physical layer packet structure for a waveform including a synchronization segment 510 that is used by the synchronization module 440 in the receiver to resolve time and frequency offsets, as discussed further below. Each packet 500 of the waveform also includes a first buffer segment 520 the content of which is unimportant but which provides time for the receiver to be correctly configured to receive and decode the packet 500. For example, the first buffer segment 520 may provide time to account for clock offsets between the transmitter and receiver, time for frequency tuning and antenna switching in the receiver, as well as time to account for any power amplifier ramp-up and/or automatic gain control settling in the transmitter and/or receiver. The waveform also includes a packet self discovery segment 530 which contains Orthogonal Frequency Division Multiplexed (OFDM) symbols containing information needed for the receiver 230 to demodulate the packet 500, as discussed further below. A filter flush segment 540 may be included between the synchronization segment 510 and the packet self discovery segment 530 to allow the receiver time to flush the filters after applying the frequency corrections discussed below and any automatic gain control hold. The packet 500 also includes a data segment 550 (also referred to as the "payload") and a second buffer segment 560. Similar to the first buffer segment 520, the content of the second buffer segment 560 may be unimportant, but the second buffer segment provides time to account for any power amplifier ramp down and/or propagation delay between the transmitter 210 and the receiver 230. Examples of the waveform illustrated in FIG. 5 are discussed in more detail in commonly owned U.S. patent application Ser. No. 12/762,619 entitled COMMUNICATION SYSTEM INCORPORATING PHYSICAL LAYER WAVEFORM STRUCTURE filed on Apr. 19, 2010.

Figure 6A:
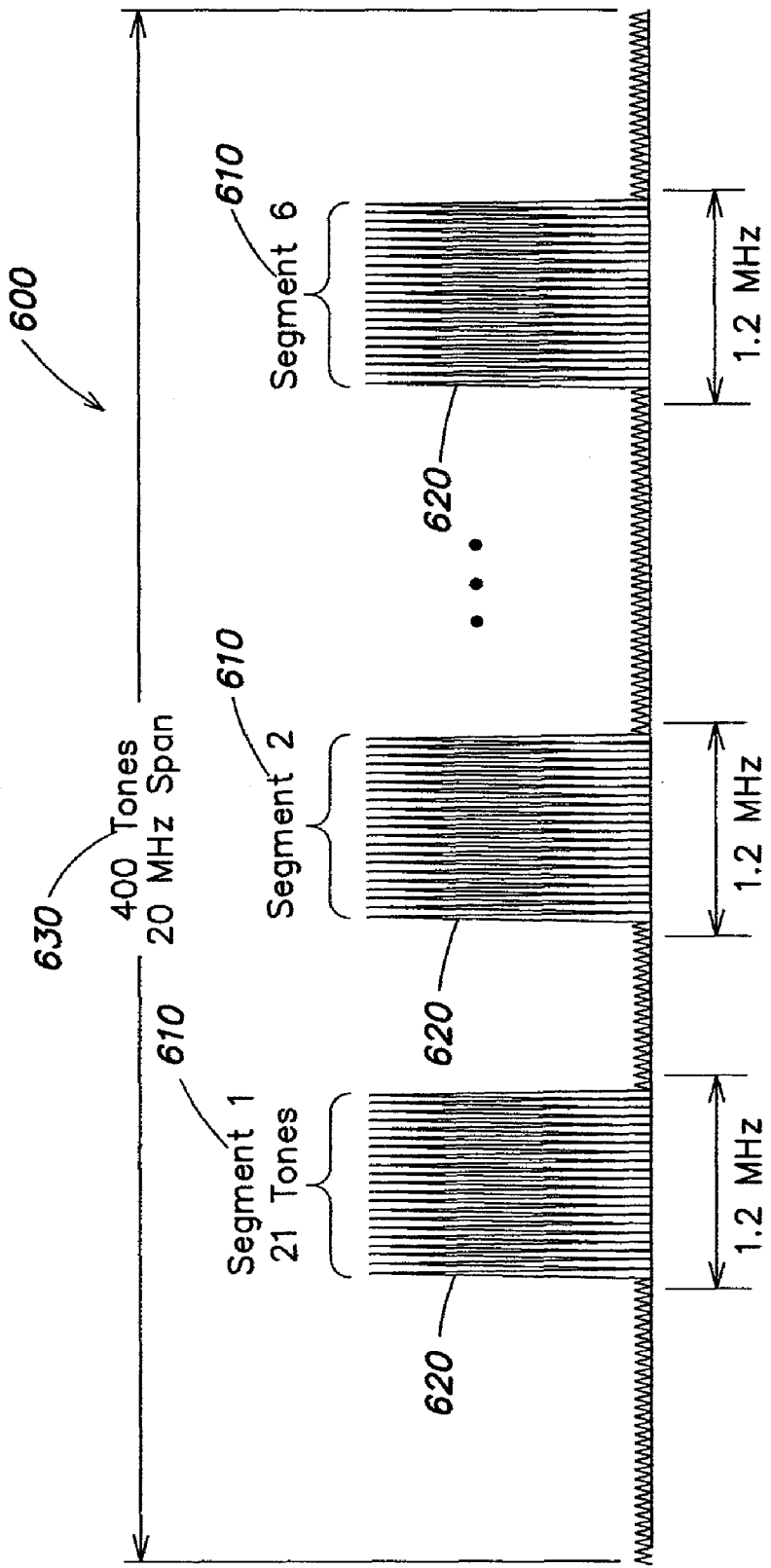
FIG. 6A is a diagram of one example of an OFDM waveform structure according to aspects of the present invention.
Figure 6B:
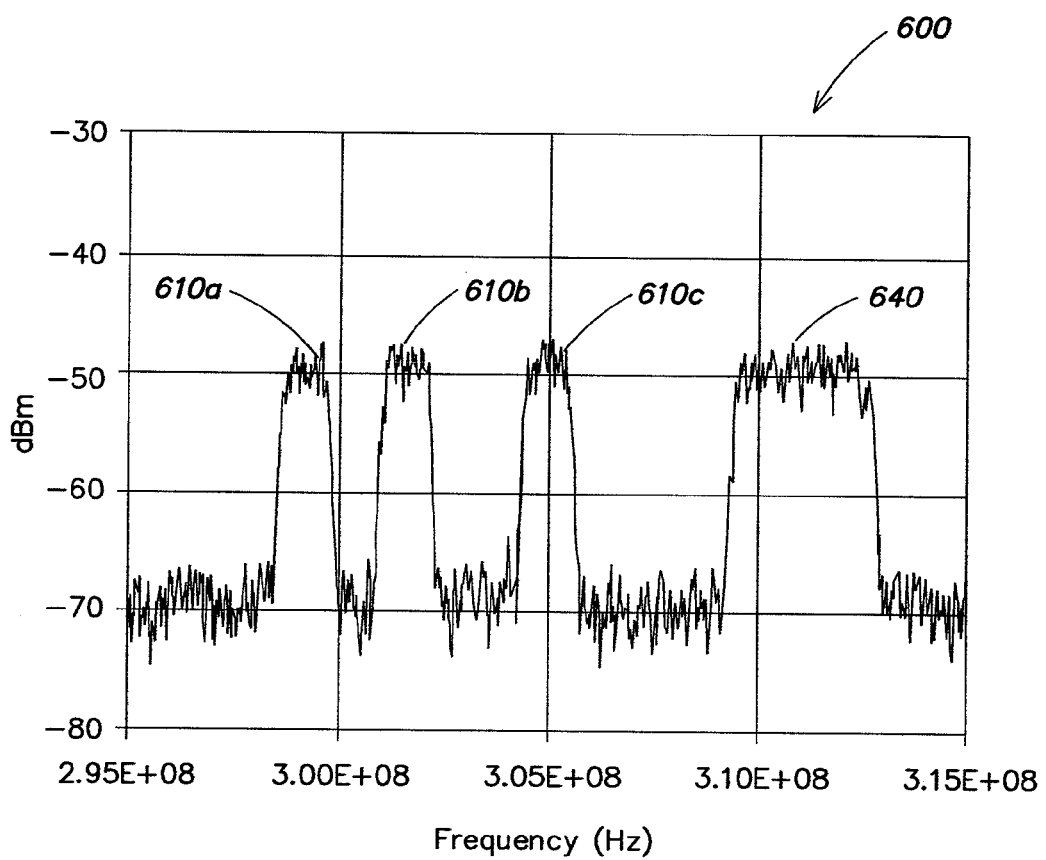
FIG. 6B is a representation of one example of a six segment channel allocation of the OFDM waveform of FIG. 6A, according to aspects of the invention.

According to one embodiment, the waveform is implemented using an orthogonal frequency division multiplexed (OFDM) symbols with physical layer time division multiple access (TDMA) channel access. The physical layer packets 500 are therefore constructed from sequences of OFDM symbols. Referring to FIG. 6A, there is illustrated one example of an OFDM waveform 600 in accordance with one embodiment. In one example, the OFDM waveform operates in up to six 1.2 MHz bandwidth channel segments 610, as shown in FIG. 2A. Bandwidth allocation of multiple 1.2 MHz segments allows for compatibility with various spectral planning requirements; however it is to be appreciated that segments of other sizes may be used. In addition, the waveform may incorporate more or fewer than six channel segments 610. In one example, each 1.2 MHz channel segment 610 includes 21 contiguous carriers 620, referred to as "tones," with a 50 kHz tone spacing. Again, it is to be appreciated that the number of tones as well as the tone spacing may be varied according to user specifications or other design requirements as are not limited to the specific examples given herein. In one example, the OFDM waveform structure is implemented with an instantaneous bandwidth, or total span, 630 of 20 MHz or 400 tones within which the six channel segments 610 are allocated. It is to be appreciated that the total span 630 may be greater or less than 20 MHz depending, for example, on the overall system design parameters and specifications. The channel segments 610 may be arbitrarily located anywhere within the 20 MHz span 630, provided that no two segments overlap. The channels segments may be contiguous or not. FIG. 6B illustrates an example of a six segment channel allocation in which three of the segments 610a, 610b and 610c are not contiguous and three segments are contiguous, as illustrated by signal portion 640.

According to one embodiment, the OFDM symbols are generated using an inverse fast Fourier transform (iFFT) algorithm. Therefore, the transmitter 210 may include a symbol generator module 340 configured to generate the OFDM symbols. An IFFT module 350 computes the inverse fast Fourier transform (iFFT) of the modulated data received from the modulator 320, thereby creating a corresponding OFDM symbol and converts the modulated data from the frequency domain into the time domain. The signal comprising the sequence of OFDM symbols is up-converted in frequency by module 380 and converted into an analog signal using a digital to analog converter 370 in preparation for wireless transmission. The signal is then amplified using an RF amplifier 390 and provided to antenna 220 for transmission. Similarly, on the receiver side, the signal is received by each antenna 240, amplified in each receiver path using a low noise amplifier 450, converted into digital data by analog-to-digital converter 460, and down-converted in frequency by module 470 to provide a digital baseband OFDM signal. Once the stream of digital baseband OFDM symbols have been received, the synchronization module 440 performs the time and frequency synchronization process discussed further below.

Figure 7:
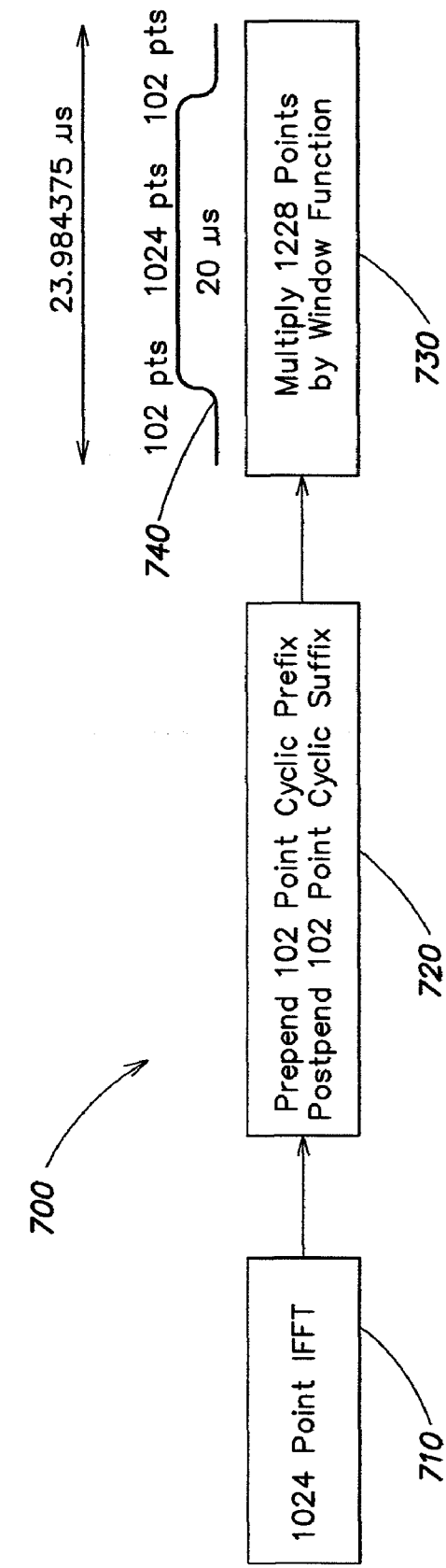
FIG. 7 is a block diagram of a process for constructing a windowed OFDM symbol according to aspects of the present invention.

In one embodiment, each OFDM symbol is created using a 1024 point iFFT. Using the iFFT provides an efficient implementation for the OFDM waveform and provides flexibility to easily adapt the waveform to different modulation schemes and/or data rates to support changing link conditions. In one example, each iFFT (OFDM symbol) includes a windowed cyclic extension (360 in FIG. 3) to reduce inter-symbol interference due to multipath effects in the wireless link. Cyclic extension includes appending a prefix and a postfix to each symbol, as discussed further below. Referring to FIG. 7, there is illustrated a block diagram of a process 700 for constructing a windowed iFFT to generate an OFDM symbol. This process may be used for each symbol in the physical layer packet. In a first step 710, the iFFT module 350 computes a 1024 point iFFT to generate the corresponding OFDM symbol. In a next step 720, the cyclic extension is implemented by module 360. In one example, the cyclic extension includes appending a 102 point cyclic prefix and a 102 point cyclic postfix to the symbol created at step 710, resulting in a 1228 point extended iFFT. The 1228 point extended iFFT is then multiplied by a window function (step 730) to improve spectral characteristics of the symbol. In one example, the window function 740 is a raised cosine window, as illustrated in FIG. 7. In one example, for a 20 microsecond (μs) base 1024 iFFT and two 102 point extensions, cyclic extension was shown to provide approximately 2 μs of multi-path delay mitigation.

Figure 8:
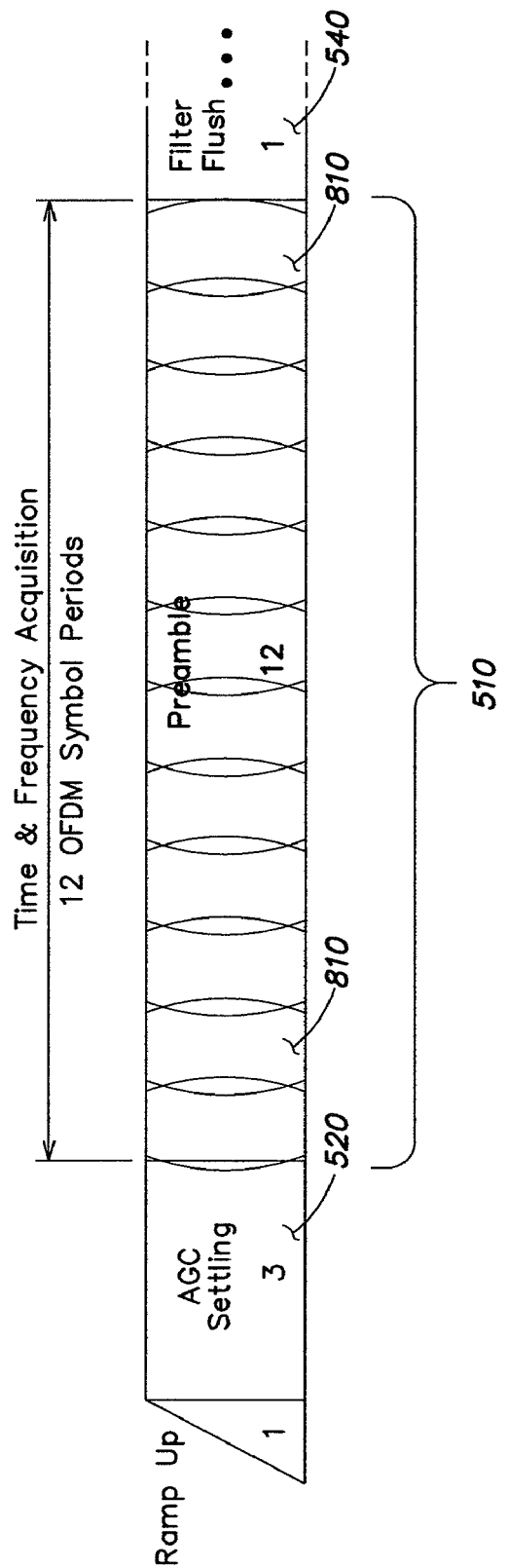
FIG. 8 is a timing diagram for one example of a preamble segment of the packet of the FIG. 5 according to aspects of the invention.

Referring again to FIG. 5, as discussed above, the synchronization segment 510, also referred to as the packet preamble 510, includes a sequence of OFDM symbols formed using the windowed iFFT process discussed above. Referring to FIG. 8, there is illustrated one example of the packet preamble 510. In the illustrated example, the preamble 510 includes twelve non-repeating OFDM symbols 810. In one example, the use of twelve symbols 810 provides a sensitivity of about +1.7 dB; however it is to be appreciated that a different number of symbols may be used, for example, eight or ten symbols. The use of non-repeating symbols may provide added security and robust time synchronization; however, it is to be appreciated that the symbols may be repeated in some applications. The twelve symbols 810 are used to acquire the time of arrival of the transmission at the receiver 230. The acquisition of the time of arrival may also be referred to as time synchronization. In one example, each symbol is individually correlated and then the correlations are summed to support successful time synchronization even where there may be a large frequency error. Time synchronization allows the receiver to compensate for such time offsets and to "reset" the waveform to defined starting point and obviate the need to maintain time synchronization between different transceivers in the network.

Figure 9:
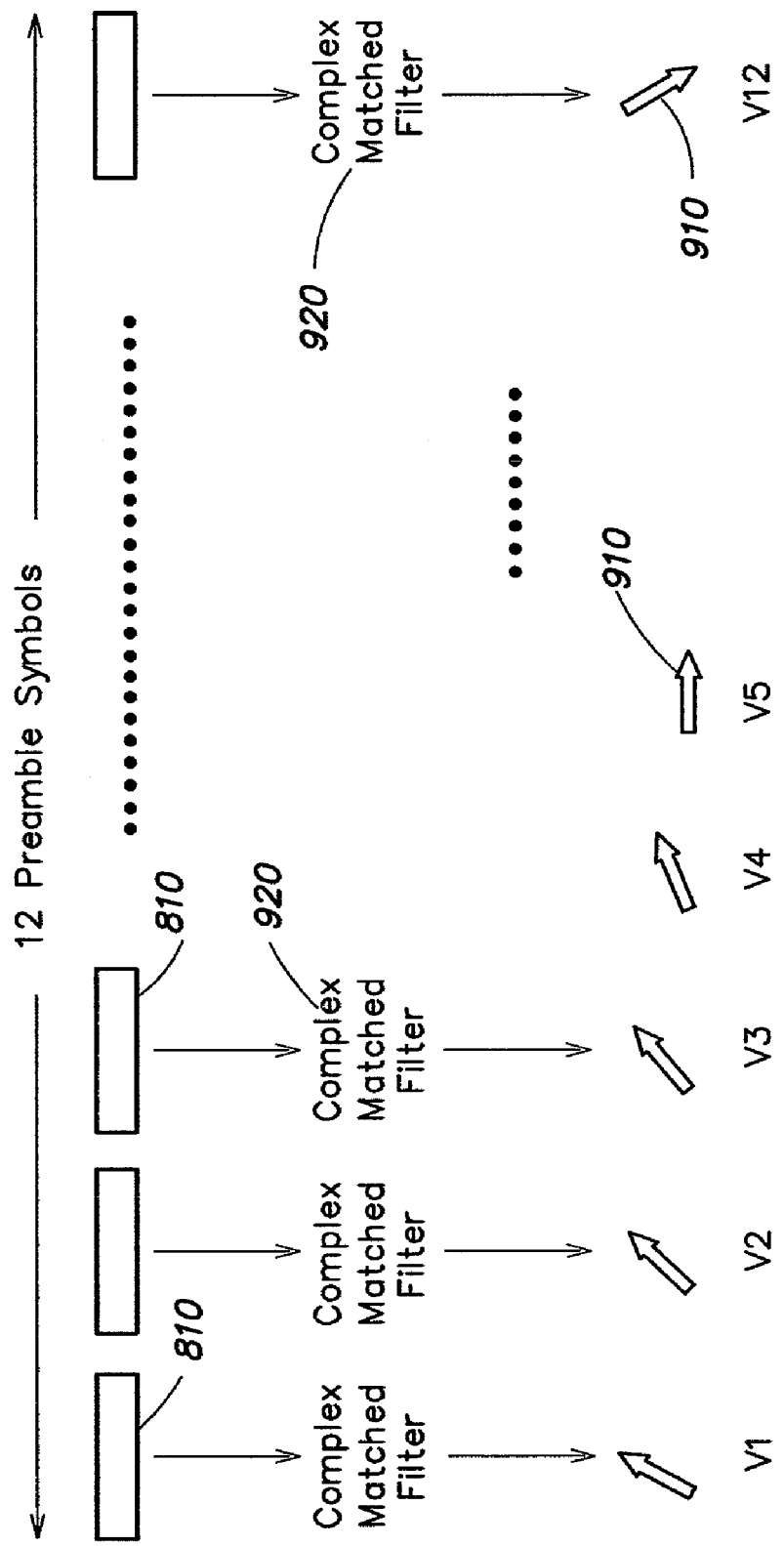
FIG. 9 is a diagram illustrating an example of a frequency acquisition process according to aspects of the invention.

In an embodiment, the twelve non-repeating OFDM symbols 810 of the preamble 550 are also used to determine frequency error. As discussed above, the local receiver 230 may also remove frequency and/or phase error based on information encoded in the waveform, as discussed further below. For example, the local receiver 230 may be configured to remove errors in frequency translation in the transmitter or receiver resulting from, for example, local oscillator frequency errors, and/or to compensate for changes in frequency caused by environmental effects and/or Doppler shift if the transmitter and/or receiver are moving. In one example, frequency acquisition (or synchronization) is performed following the time acquisition/synchronization process. In one embodiment, a corrected frequency estimate is computed for each symbol in the preamble 510. These frequency estimates may be computed on average rotation vectors 910 from each symbol to the adjacent symbol, as illustrated in FIG. 9. In one example, complex matched filters 920 are used to compute the frequency error based on the average rotation vectors 910 from symbol to adjacent symbol.

Figure 10A:
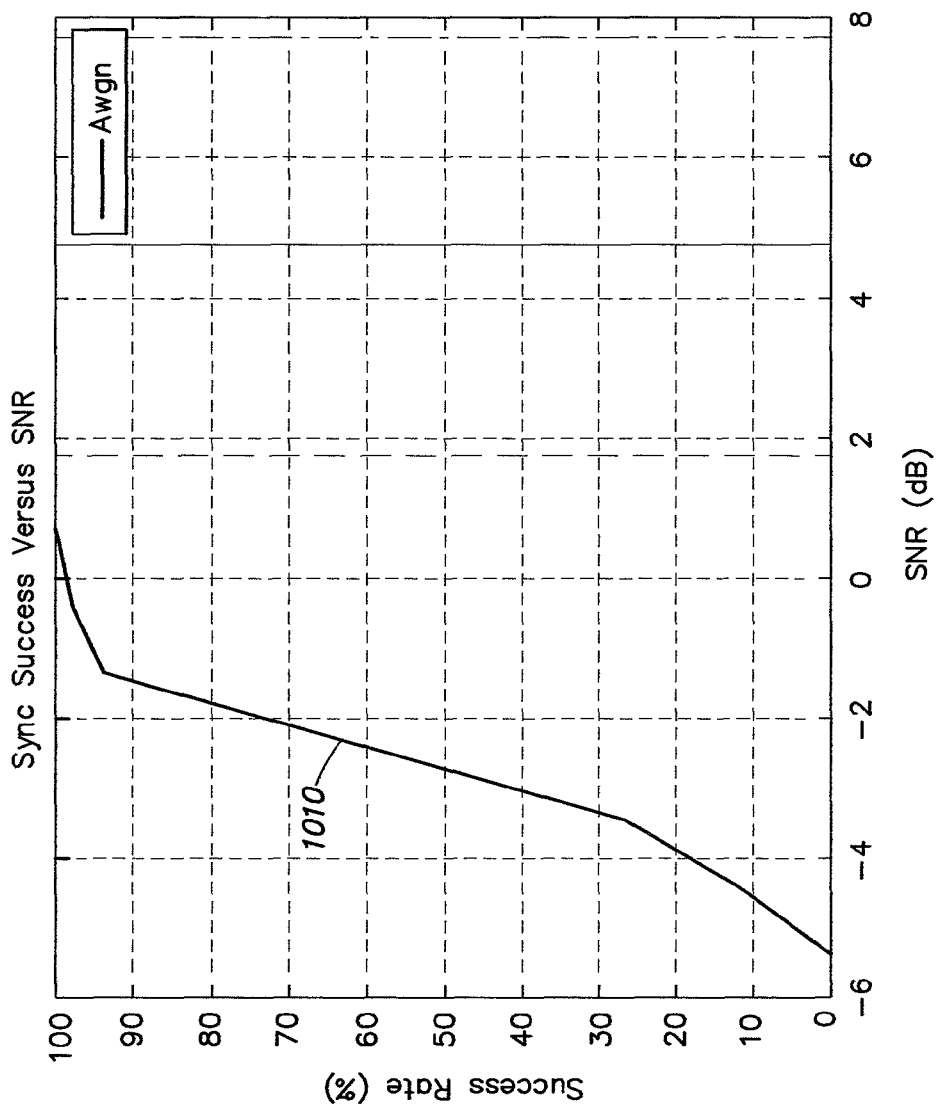
FIG. 10A is a graph of time synchronization success rate as a function of signal-to-noise ratio for an example of a waveform having the preamble structure of FIG. 9, according to aspects of the invention.
Figure 10B:
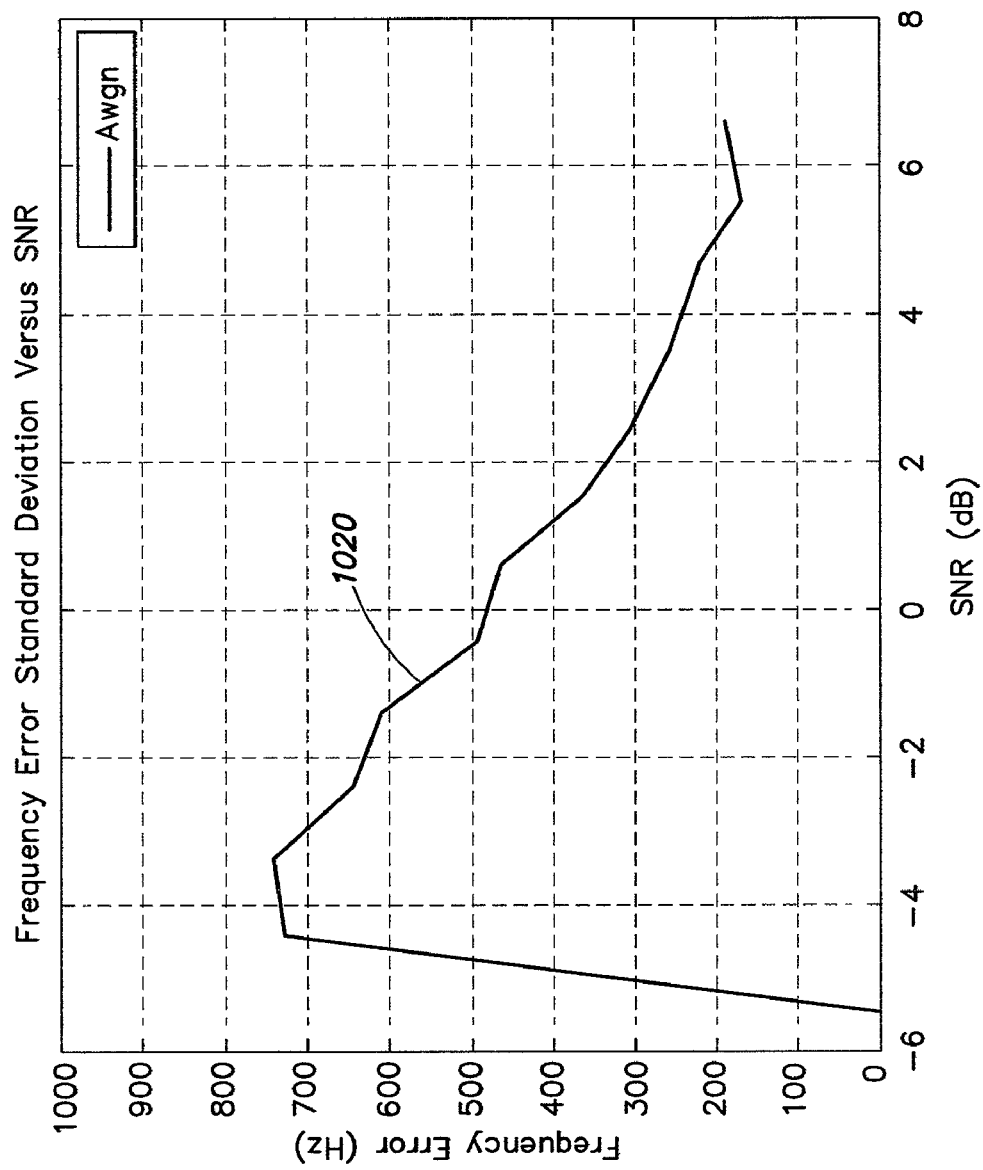
FIG. 10B is a graph of frequency error as a function of signal-to-noise ratio for an example of a waveform having the preamble structure of FIG. 9, according to aspects of the invention.

Simulations have demonstrated that the waveform allows for the time synchronization success rate (i.e., time synchronization successfully achieved) of 100%, or close to 100%, for positive signal-to-noise ratios (i.e., above 0 dB) in a channel with additive white Gaussian noise (AWGN). FIG. 10A illustrates a graph of time acquisition success rate (%) as a function of the signal-to-noise ratio 1010 (in dB) for a simulated AWGN channel. FIG. 10B illustrates a graph of the frequency error 1020 (in Hertz) as a function of signal-to-noise ratio (in dB) for the same simulated AWGN channel. As can be seen from FIG. 10B, the frequency error, using the frequency synchronization process discussed above, is only a few hundred Hertz give a positive signal-to-noise ratio. Additional simulations have shown that the time acquisition success rate in channels that have severe multipath effects, fading, interference, or other conditions not accounted for in an AWGN model channel, is still very good (e.g., generally over 90%) given a signal-to-noise ratio of at least 10 dB, and improves to close to 100% if the signal-to-noise ratio increases to 15 dB or above. Thus, the synchronization module 440 in cooperation with a waveform having the preamble segment 510 discussed above allows robust, reliable communications between transceivers, even for links with less than ideal channel conditions.

Referring again to FIG. 4, following time and frequency synchronization/signal acquisition, an FFT module 475 computes the fast Fourier transform (FFT) of the OFDM symbol to convert the signal from the time domain into the frequency domain. The FFT module 475 may be configured to account for any cyclic extension that may have been performed by the transmitter 210.

Figure 11:
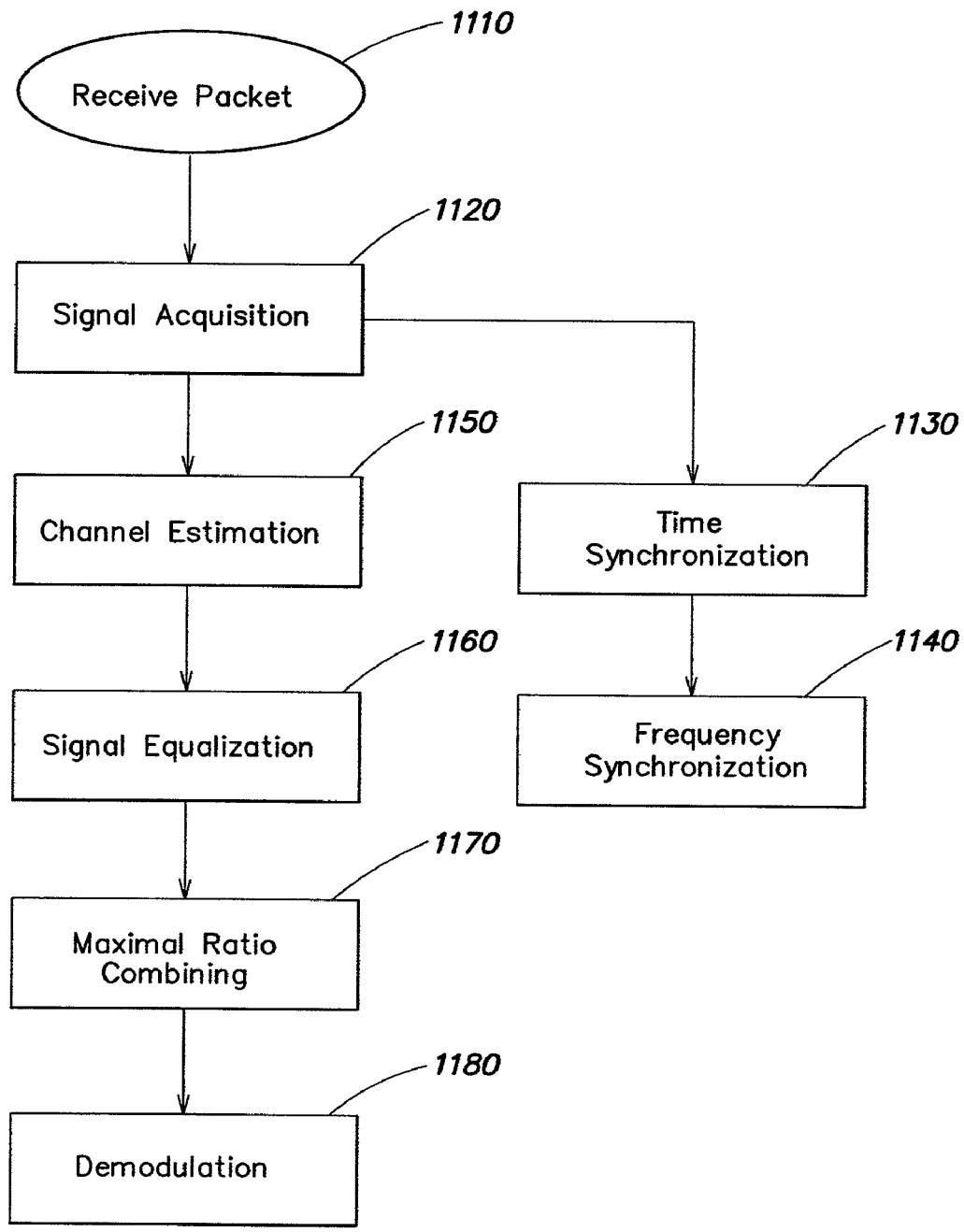
FIG. 11 is a block diagram of one example of a method of acquiring a signal at a receiver according to aspects of the invention.

Referring to FIG. 11, there is illustrated an example of a flow diagram of a method of obtaining a signal in a receiver such as receiver 230. The receiver receives the signal (step 1110) and then acquires the signal (step 1120) using the time synchronization (step 1130) and frequency synchronization (step 1140) processes discussed above. After successful signal acquisition in step 1120, the local receiver may use channel probe information embedded in the waveform by a channel encoding module 330 of the transmitter 210 to remove phase shift and amplitude scaling, as discussed further below. In one embodiment, the system exploits channel probes (also referred to as pilot tones) embedded in the waveform to obtain evidence of channel conditions, include noise variance estimates, (channel estimation process step 1150 performed by channel estimation module 480) and to normalize received symbols in amplitude and phase (equalization process 1160 performed by equalization module 490), as discussed further below. Thus, signal acquisition and partial demodulation may be performed independently for each channel, removing the need for synchronization across all receiver channels. The normalized symbol streams and noise variance estimates are then provided to the maximal ratio combiner 430, as discussed further below. In one example, the system uses digital transmission to provide the normalized symbol streams and noise variance estimates to a central location where the maximal ratio combining and final demodulation are performed.

As discussed above, after the receiver channel has acquired the signal in time and frequency (process 1120), the receiver uses channel probe information (also referred to as pilot tones) embedded in the waveform to remove phase shift and amplitude scaling (processes 1150 and 1160). In one example, the pilot tones are inserted into the data segment 550 (see FIG. 5) of the packet 500. As discussed above with reference to FIG. 6A, in one example, each 1.2 MHz section of the waveform contains 21 tones modulated with QPSK or BPSK single carrier modulation. According to one example, both QPSK and BPSK modes are coherently demodulated using pilot symbol assisted modulation (PSAM) for robust demodulation in high dynamic scenarios and multipath environments. Referring to FIG. 3, the transmitter includes a pilot channel encode module 330 that inserts the pilot tones into the data segment 550 of the waveform. For systems with multiple transmitter paths (e.g., configured for MIMO operation), pilot tone channel encoding is done individually for each channel; accordingly, additional transmitter paths may added prior to the pilot channel encode module, as indicated by arrow 315.

According to one embodiment, for a multi-transmitter path system, the transmitter 210 may implement space-time coding, for example, using an Alamouti encoder (not shown), to provide additional path diversity. In this example, the receivers may include corresponding Alamouti decoders; however, it is to be appreciated that space-time coding is optional and that the maximal ratio combining process is independent of any space-time coding.

Figure 12:
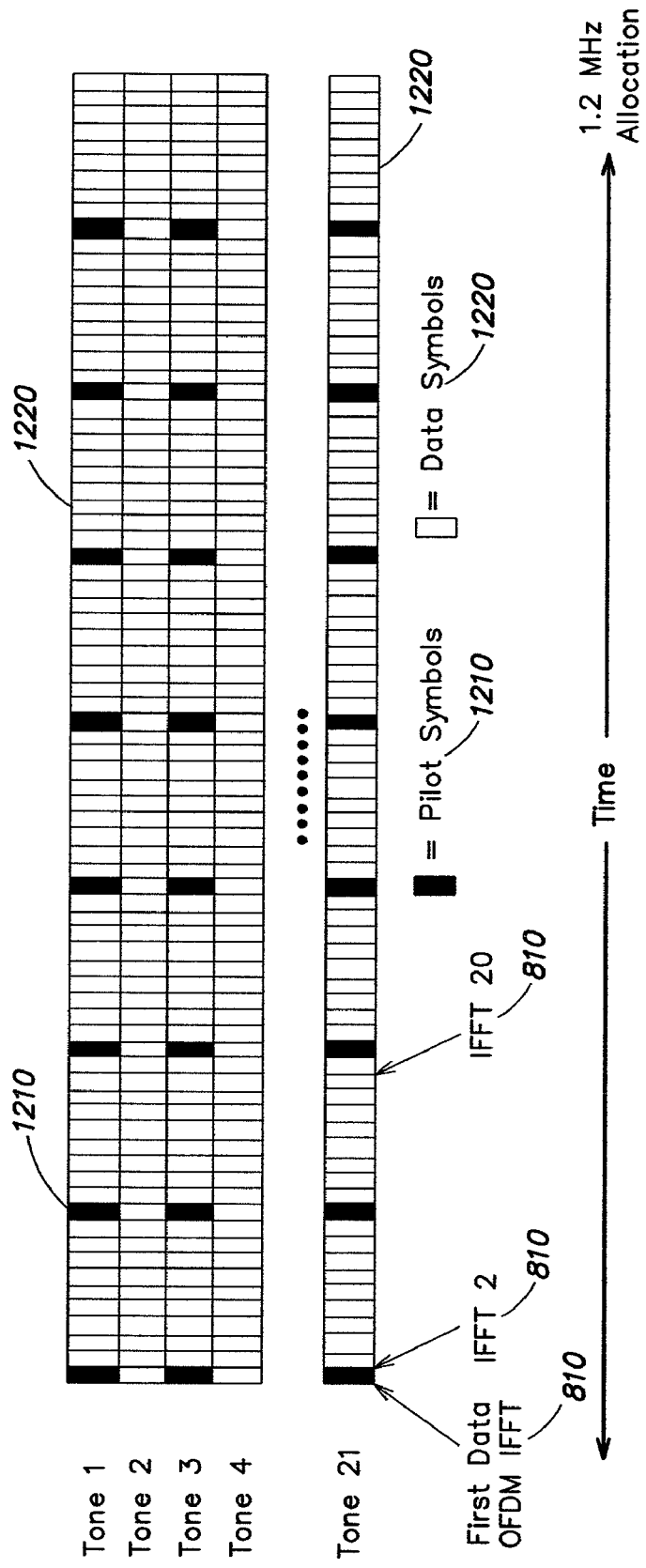
FIG. 12 is an illustration of an example of a waveform section showing pilot symbols interspersed with the data symbols according to aspects of the invention.

Referring to FIG. 12, there is illustrated an example of a waveform section showing pilot symbols 1210 interspersed with the data symbols 1220. As discussed above, each symbol is created using an inverse fast Fourier transform (iFFT), and in one example, every 10th data symbol is a pilot symbol 1210, starting with the first data packet. The pilot symbols 1210 can be demodulated and, because they contain known information, may be used to reconstruct channel conditions (such as delay, attenuation, etc.); thus providing the channel estimation. MIMO operation requires estimation of M×N channels as each of N receivers forms an estimate of the channel from each of M transmitters. In one example, in single transmitter operation one antenna 220 transmits on all pilot symbol tones. To support MIMO operation, additional pilot tones may be interlaced within the pilot symbol. In one example, frequency-orthogonal pilot tones are added to the existing pilot symbol.

Figure 13:
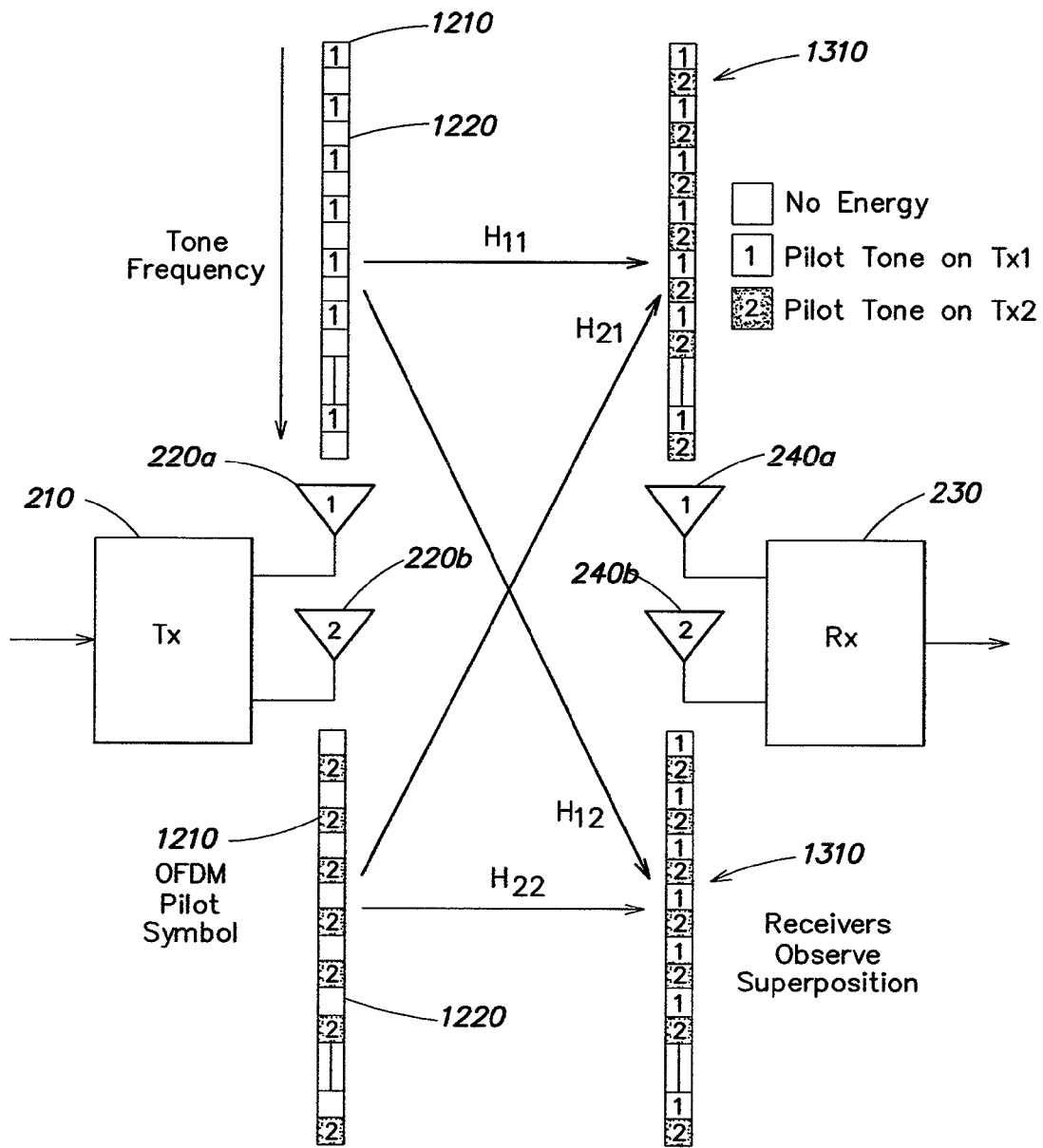
FIG. 13 is an illustration of the use of frequency orthogonality between the even and odd pilot tones to allow a receiver to discriminate between emissions from each transmitter, according to aspects of the invention.

According to one embodiment, in dual transmitter operation, as illustrated for example in FIG. 2, each antenna 220 transmits on half of the pilot symbol tones. For example, referring to FIG. 13, antenna 220a may transmit on the odd tones and antenna 220b may transmit on the even tones. Thus, for antenna 220a, pilot symbols 1210 are inserted only in odd tones and the even tones contain data symbols 1220. Even tone pilots symbols may be interpolated from the neighboring odd tone pilots. For antenna 220b, pilot symbols 1210 are inserted only in even tones and the odd tones contain data symbols 1220. Frequency orthogonality between the even and odd pilot tones allows the receiver to discriminate between emissions from each transmitter, as illustrated in FIG. 13. The receiver 230 observes a signal stream 1310 at each receive antenna 240a, 240b that comprises a superposition of the pilot tones from both transmit antennas 220a, 220b. The channel estimator 480 may measure the complex scaling of the pilot tones transmitted every ten (or other multiple) symbols. Linear filtering may be used to smooth these channel estimates to form estimates for every tone frequency. Linear interpolation may then be used to form estimates at every symbol time. This approach is extendible to support additional transmitters and receivers (e.g., 4×4 MIMO). In one embodiment, the channel estimation process 1150 includes estimating noise variance which is then used in the maximal ratio combiner 430. Thus, the SNR may be estimated or determined on individual tones and symbols, allowing for robust system performance even where channel conditions may vary over the transmission of the complete waveform (e.g., varying conditions from symbol to symbol or group of symbols to group of symbols) or may vary over frequency.

As discussed above, signal acquisition (in time and frequency), as well as partial demodulation (for channel estimation) may be done independently for each channel, as illustrated in FIG. 4, obviating the need for synchronization across multiple channels. Referring to FIG. 4, each receiver creates digital symbol stream that is compensated for time and frequency offsets and normalized based on the estimates of channel conditions. The normalized symbol stream from each receiver path 230 is then passed via a digital interface to the maximal ratio combiner 430 where they can be coherently combined. This approach removes the need for coherent processing between the receivers and enables maximal ratio combining of waveforms from multiple, physically distributed receivers. The combining process forms the linear combination of the received symbol streams to provide a composite signal having the maximal signal to noise ratio. The receiver 230 then completes the remaining demodulation steps (using demodulator 420) to retrieve the digital waveform content.

As discussed above, in one embodiment, the packet 500 comprises the packet self discovery segment 530 which contains OFDM symbols containing information needed for the receiver 230 to demodulate the packet. In one example, the packet self discovery segment 530 includes three non-repeating OFDM symbols 1010, which are windowed iFFTs as discussed above, which may provide twelve bits of information to the receiver. These twelve bits describe characteristics of the packet and in particular the payload (data segment 550) required for the receiver to demodulate the packet. This information includes, for example, the packet size, the modulation type used by the transmitter (e.g., BPSK, QPSK, QAM, etc.), the number of channel segments, the code rate for any forward error correction encoding that was implemented by the transmitter, and the system configuration (e.g., 2T×2R MIMO). In one embodiment, the information contained within the twelve bits of the packet self discovery segment 530 is unknown by the receiver 230 until the packet self discovery segment 530 is received and decoded, which allows the receiver to be adaptable to varying packet types and sizes since the demodulation information can be retrieved and implemented dynamically for each packet. In one example, each symbol in the packet self discovery segment 530 provides four bits of information encoded as one of sixteen Walsh sequences modulated onto the twenty-one tone channel segment discussed above. For each symbol, the receiver selects the Walsh sequence with the maximum likelihood of success and decodes the four bits to obtain the demodulation information.

As discussed above, each receiver is configured synchronize to the received waveform using only its local received signal without requiring any information about other receivers and obviating the need for coherent processing between the receivers, and also removing the need to combine signals contemporaneously. The local receiver may also remove frequency and/or phase error based on information encoded in the waveform. Furthermore, the local receiver also uses channel probe information embedded in the waveform to provide channel estimates for each channel and thereby adjust the received signals for phase shift and amplitude scaling. As discussed above, signal acquisition (in time and frequency), as well as partial demodulation (for channel estimation) may be done independently for each channel, obviating the need for synchronization across multiple channels. Therefore, combining of the signals from the receivers may be delayed relative to the time of reception of the signals. As a result, the receivers to be located in remote and/or arbitrary physical locations and therefore maximal ratio combining can be implemented, providing the maximum diversity benefit, without the constraints imposed by existing and conventional implementations.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of maximal ratio combining in a wireless radio network, the method comprising:
   receiving a first signal comprising a packet-based waveform structure at a first receiver, each packet of the waveform comprising a preamble segment, a payload segment, and a packet self discovery segment, the preamble segment comprising a plurality of orthogonal frequency division multiplexed (OFDM) symbols;
   receiving a second signal comprising the waveform structure at a second receiver;
   acquiring a time of arrival of the first signal at the first receiver based on individually correlating each OFDM symbol of the preamble segment to provide a first series of correlations and summing the first series of correlations;
   acquiring a time of arrival of the second signal at the second receiver based on individually correlating each OFDM symbol of the preamble segment to provide a second series of correlations and summing the second series of correlations;
   normalizing the first signal based on pilot symbols encoded within the payload segment of the waveform structure to provide a first normalized signal;
   normalizing the second signal based on the pilot symbols encoded within the payload segment of the waveform structure to provide a second normalized signal; and
   combining the first and second normalized signals using a maximal ratio combiner coupled to each of the first and second receivers to provide a received signal.

2. The method as claimed in claim 1, further comprising demodulating the received signal based on information contained in the packet self discovery segment.

3. The method as claimed in claim 1, further comprising:
   determining a first frequency error in first signal by computing a first frequency error for each symbol in the preamble segment based on average rotation vectors from symbol to adjacent symbol; and
   determining a second frequency error in second signal by computing a second frequency error for each symbol in the preamble segment based on average rotation vectors from symbol to adjacent symbol.

4. The method as claimed in claim 1, further comprising:
- at the first receiver, estimating channel conditions of a first communication channel over which the first signal is received; and
- at the second receiver, estimating channel conditions of a second communication channel over which the second signal is received.

5. The method as claimed in claim 4, wherein the first and second signals each comprises a sequence of OFDM symbols, and wherein estimating the channel conditions for each channel includes:
- demodulating the pilot symbols embedded within the payload segment to determine a phase shift and amplitude scaling applied to the first and second signals by conditions of the first and second channels, respectively.

6. The method as claimed in claim 5, wherein each pilot symbol comprises a plurality of tones of different frequencies, the plurality of tones including a plurality of pilot tones; and
- wherein determining the phase shift and amplitude scaling includes measuring a complex scaling of each pilot tone to provide a pilot tone channel estimate for each pilot tone.

7. The method as claimed in claim 6, further comprising, for each of the first and second signals:
- applying linear filtering to smooth the pilot tone channel estimates to provide channel estimates for each tone of the plurality of tones; and
- linearly interpolating the channel estimates to provide a symbol estimate for each OFDM symbol of the sequence of OFDM symbols.

8. The method as claimed in claim 1, wherein combining the first and second normalized signals includes:
- determining a first signal to noise ratio for the first signal;
- determining a second signal to noise ratio for the second signal; and
- weighting the first and second signals based on the first and second signal to noise ratios, respectively.

9. A method of maximal ratio combining in a wireless radio network, the method comprising:
- receiving a signal at each of a plurality of receivers to provide a locally received signal at each receiver, the signal comprising a packet-based waveform in which each packet comprises a sequence of orthogonal frequency division multiplexed (OFDM) symbols arranged into a plurality of waveform segments including a preamble segment, a payload segment, and a packet self discovery segment;
- at each receiver, synchronizing the receiver to the locally received signal in time based on characteristics of the locally received signal without synchronizing across the plurality of receivers;
- at each receiver, removing frequency error from the locally received signal based on the preamble segment;
- at each receiver, estimating channel conditions of a communications channel over which the locally received signal is received based on pilot symbols embedded in the payload segment;
- at each receiver, normalizing the locally received signal based on the estimated channel conditions to provide a plurality of normalized signals; and
- combining the plurality of normalized signals using a maximal ratio combiner coupled to each of the plurality of receivers to provide a received signal.

10. The method as claimed in claim 9, wherein synchronizing the receiver to the locally received signal in time comprises individually correlating each OFDM symbol in the preamble segment to provide a series of correlations and summing the series of correlations.

11. The method as claimed in claim 9, wherein removing the frequency error from the locally received signal includes:
- determining a symbol frequency error for each OFDM symbol in the preamble segment based on average rotation vectors from symbol to adjacent symbol; and
- compensating each symbol in the locally received signal for the symbol frequency error.

12. The method as claimed in claim 9, wherein estimating the channel conditions includes:
- demodulating the pilot symbols to determine a phase shift and amplitude scaling applied to the locally received signal by the channel conditions of the communications channel over which the locally received signal is received.

13. The method as claimed in claim 12, wherein each pilot symbol comprises a plurality of tones of different frequencies, the plurality of tones including a plurality of pilot tones; and
- wherein determining the phase shift and amplitude scaling includes measuring a complex scaling of each pilot tone to provide a pilot tone channel estimate for each pilot tone.

14. The method as claimed in claim 13, further comprising:
- applying linear filtering to smooth the pilot tone channel estimates to provide channel estimates for each tone of the plurality of tones; and
- linearly interpolating the channel estimates to provide a symbol estimate for each OFDM symbol of the sequence of OFDM symbols.

15. The method as claimed in claim 9, wherein combining the plurality of normalized signals includes:
- determining a signal to noise ratio for each normalized signal; and
- weighting each normalized signal based on the signal to noise ratio.

16. The method as claimed in claim 9, further comprising demodulating the received signal based on information contained in the packet self discovery segment.

* * * * *